United States Patent [19]

Kamimura

[11] Patent Number: 5,134,670

[45] Date of Patent: Jul. 28, 1992

[54] LINEAR MOTION GUIDE UNIT HAVING A REDUCED HEIGHT

[75] Inventor: Akihiko Kamimura, Yokosuka, Japan

[73] Assignee: Nippon Thompson Co., Ltd., Japan

[21] Appl. No.: 631,601

[22] Filed: Dec. 20, 1990

[51] Int. Cl.[5] ............................................. F16C 29/04
[52] U.S. Cl. ...................................................... 384/49
[58] Field of Search ....................... 384/49, 47, 43, 45, 384/59

[56] References Cited

U.S. PATENT DOCUMENTS

| | | | |
|---|---|---|---|
| 4,181,376 | 1/1980 | Tah-Sun | 384/49 |
| 4,929,097 | 5/1990 | Mottate | 384/49 |
| 4,957,267 | 9/1990 | Terai | 384/47 |

Primary Examiner—Lenard A. Footland
Attorney, Agent, or Firm—Skjerven, Morrill, MacPherson, Franklin & Friel

[57] ABSTRACT

A linear motion guide unit including a bed, a sliding table and a plurality of rolling members interposed between the bed and the sliding table to provide a relative sliding motion therebetween. The bed has an outwardly extending mounting wall section and it is mounted on a housing having an associated recess or hole. Thus, when the linear motion guide unit is mounted in position, it is located in the associated recess or hole so that the overall exposed height of the present linear motion guide unit can be made extremely small, thereby allowing to be used in moving parts of various devices, such as floppy disc and hard disc drives.

4 Claims, 2 Drawing Sheets

FIG. I
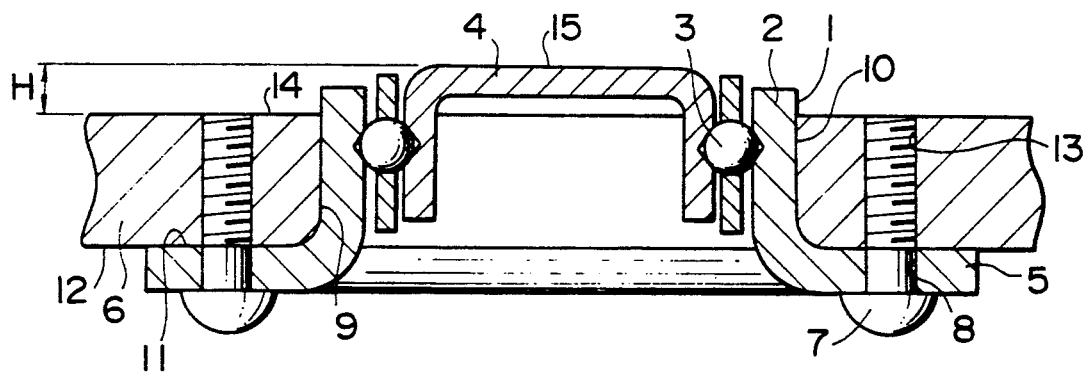
FIG. 2
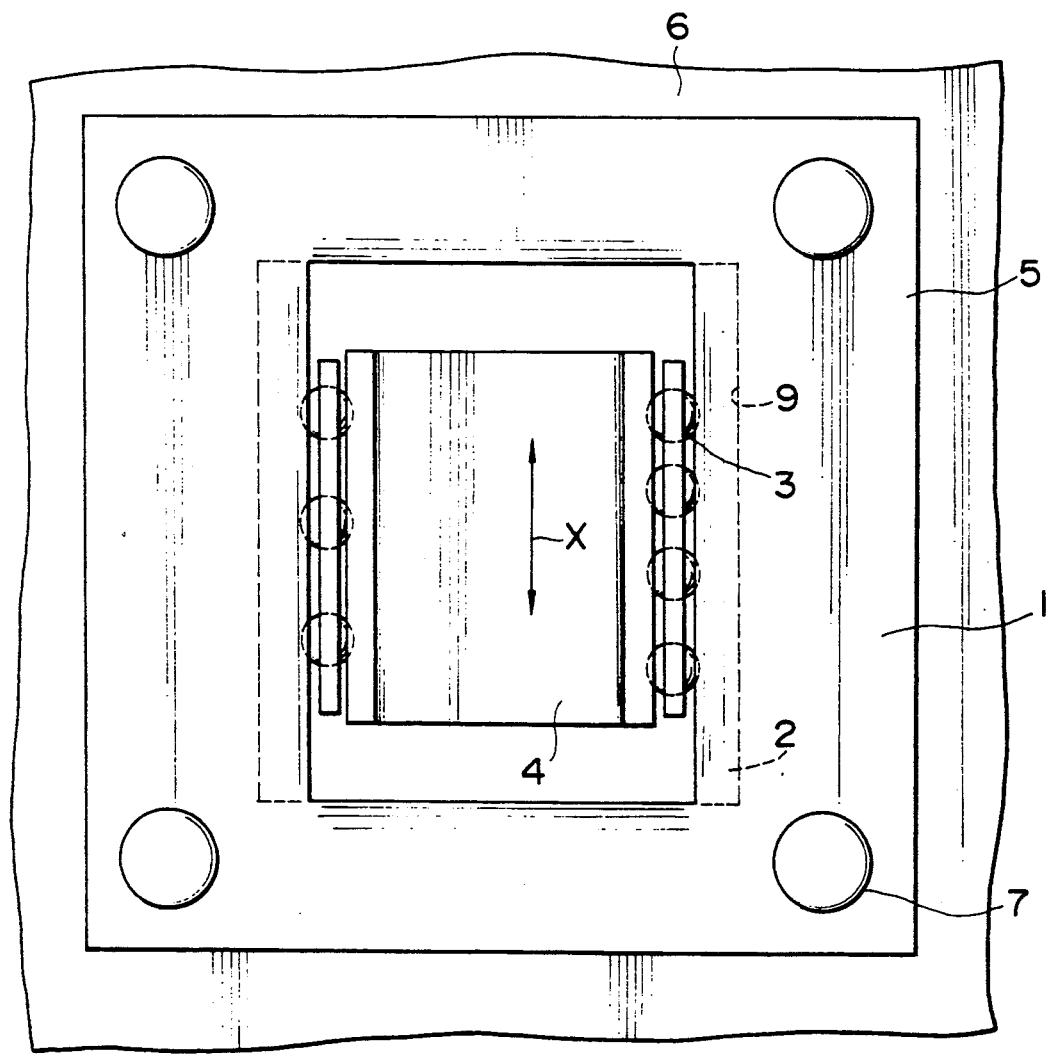

LINEAR MOTION GUIDE UNIT HAVING A REDUCED HEIGHT

BACKGROUND OF THE INVENTION

1. Field of the Invention

This invention generally relates to a linear motion guide unit suitable for use in moving parts of various machines and apparatuses, and, in particular, to a height-reduced linear motion guide unit.

2. Description of the Prior Art

A typical example of a prior art linear motion guide unit for use in moving parts of various devices is illustrated in FIG. 2 of Japanese Pat. Laid-open Pub. No. 61-136018. However, as shown in FIG. 5 of this application, this type of linear motion guide unit is fixedly mounted on a housing A of a device by tightly securing its bed B thereto using a bolt C. The bed B has a generally U-shaped cross section and it is mounted on the housing A with its bottom wall portion in contact with the housing A. A sliding table E also having a generally U-shaped cross section is received in a space defined by the bed B, and a plurality of rolling members D are interposed between the bed B and the sliding table E so that the sliding table E can move relative to the bed B and thus to the housing A along a straight path back and forth. Such a linear motion guide unit is commonly used in the moving parts of such devices as floppy disc drives and hard disc drives.

The prior art linear motion guide units typically have a relatively large height H from a surface F of a housing A to a top surface G of a sliding table, as indicated in FIG. 5, on the order of approximately 7 mm at minimum. However, there has been a need to reduce the height of such a linear motion guide unit, first, to allow a high degree of flexibility in the design of such devices as floppy disk drives and had disc drives, and second to increase the scope of linear guide motion unit application, such as, for instance, use the high precision measuring devices.

SUMMARY OF THE INVENTION

In accordance with the present invention, there is provided a linear motion guide unit having a reduced height. The linear motion guide unit generally includes a bed, a sliding table and a plurality of rolling members, such as rollers and balls, interposed between the bed and the sliding table. The main feature of the present invention resides in the structure of the bed. That is, in accordance with the present invention, the bed has a pair of guide wall sections extending generally vertically, a connecting wall section connecting the pair of guide wall sections, and a plurality of mounting sections which extend generally horizontally from respective ones of the pair of guide wall sections in a direction away from the opposite guide wall sections. In the preferred embodiment, the bed is generally in the shape of a plate which is formed with a window with its opposite sides bent upwardly to thereby define the pair of guide wall sections. In this case, the plate section of the bed defines the connecting wall and mounting sections. Thus, a plurality of mounting holes may be formed in the plate.

An outer guide groove is formed in each of the opposite surfaces of the pair of guide wall sections. An inner guide groove is formed in a corresponding outer surface of the sliding table. Thus, when assembled, paired outer and inner guide grooves define a guide channel, in which a plurality of rolling members may be provided. A retainer may also be provided in the guide channel so as to keep the rolling members spaced apart each other in a predetermined manner, such as at a predetermined pitch.

The present linear motion guide unit may be mounted on a housing having a corresponding recess or a through-hole as being located therein at least partly. Since the mounting sections extend generally horizontally and outwardly in opposite directions from the pair of side wall sections, the linear motion guide unit may be located in the corresponding recess or a hole at least partly. Therefore, the height of the linear motion guide unit can be minimized when mounted on an associated housing.

It is therefore a primary object of the present invention to obviate the disadvantages of the prior art as described above and to provide an improved linear motion guide unit having a significantly reduced height.

Another object of the present invention is to provide an improved linear motion guide unit having a height measured from a surface of a housing, to which the present linear motion guide unit is attached, to a top surface of its sliding table in a range between approximately 1.5 mm and 5 mm.

A further object of the present invention is to provide an improved linear motion guide unit simple in structure, easy to manufacture and thus low in cost.

A still further object of the present invention is to provide an improved linear motion guide unit suitable for use in moving parts of various small-sized devices, such as floppy disc drives, hard disc drives and high precision measuring devices.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing in transverse cross section a linear motion guide unit constructed in accordance with one embodiment of the present invention as mounted on an associated housing;

FIG. 2 is a schematic illustration showing in bottom view the linear motion guide unit shown in FIG. 1;

DESCRIPTION OF THE PREFERRED EMBODIMENT

Figure 3:
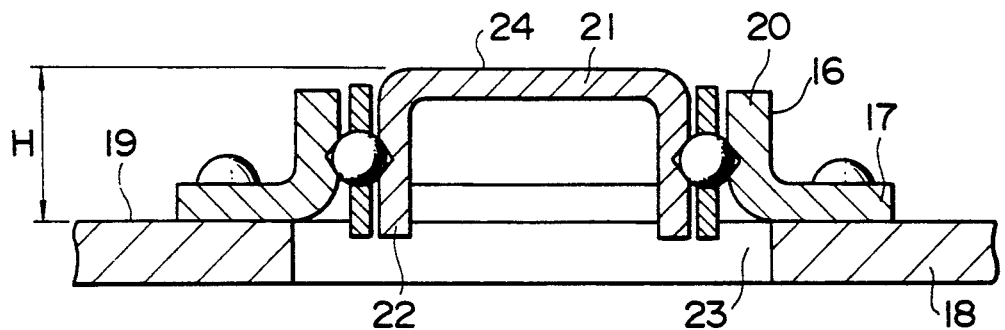
FIGS. 3 and 4 are schematic illustrations showing in transverse cross section alternative embodiments of the present invention as mounted on an associated housing.

Referring first to FIGS. 1 and 2, there is schematically shown a linear motion guide unit constructed in accordance with one embodiment of the present invention. As shown, the present linear motion guide unit generally includes a bed 1, a sliding table 4 and a plurality of rolling members 3, such as balls or rollers. The bed 1 has a pair of guide wall sections 2 which generally extend vertically, a pair of connecting wall sections which connect the pair of guide wall sections and a pair of mounting sections 5 which extend generally horizontally outwardly from the respective guide wall sections 2. In the illustrated embodiment, the bed 1 is plate-shaped or generally in the shape of a picture frame. That is, a window is opened generally at the center of a rectangular plate, and the opposite side sections of the window are bent to define the pair of guide wall sections 2.

Each of the guide wall sections 2 has an inner guide surface which is formed with an outer guide groove. The sliding table 4 has a generally U-shaped cross section and thus it has a flat top wall section and a pair of vertical wall sections which extend vertically from the respective sides of the top wall section. An inner guide groove is formed at an outer guide surface of each of the vertical wall sections. Thus, when assembled, a guide channel is defined between opposed inner and outer guide grooves, in which the rolling members 3 are provided to provide a rolling contact between the bed 1 and the sliding table 4. A retainer for retaining the rolling members spaced apart in a predetermined fashion may also be provided. Thus, the sliding table 4 may move relative to the bed 1 along a straight line back and forth as indicated by a double arrow X in FIG. 2.

In the case of the embodiment shown in FIGS. 1 and 2, the mounting sections 5 and connecting sections define a continuous frame or flange, and a plurality (four in the present embodiment) of mounting holes 7 are formed in the frame. A housing of a device to which the present linear motion guide unit is to be mounted has a through-hole 9. Thus, when the present linear motion guide unit is mounted in position, its substantial portion is located inside the hole 9 preferably with an outer surface 10 of each of the pair of guide wall sections 2 in contact with the edge of the hole 9. The mounting section or frame 5 is brought in contact with a bottom surface 12 of the housing 6 so that the present linear motion guide unit may be set in position by threading bolts 7 into threaded holes 13.

In this embodiment, a substantial portion of the linear motion guide unit is located in the hole 9 of the housing 6, and, therefore, an exposed height H from a front surface 14 of the housing 6 to a top surface 15 of the sliding table is extremely small and can be made on the order of 3 mm. Moreover, since the linear motion guide unit is inserted into the hole of the housing, there is provided an enhanced structural integrity between the present linear motion guide unit and the housing 6. That is, when the guide wall sections 2 are in abutment against the surfaces of the hole 9, the guide wall sections 2 can tolerate larger forces, so that the bed 1 can be made from a thinner sheet or plate of any desired material, such as a metal. This would contribute to reduce the weight of the unit, which can be important in such devices as floppy disc and hard disc drives.

It is to be noted that the rolling members 3 may be of any desired type, such as balls and rollers. In addition, although a limited stroke type linear motion guide unit is illustrated in FIGS. 1 and 2, it may be of an indefinite stroke type linear motion guide unit having a guide channel in the form of an endless loop.

FIG. 3 illustrates another embodiment of the present invention. The linear motion guide unit of this embodiment generally includes a bed 16, a sliding table 21 and a plurality of rolling members interposed between the bed 16 and the sliding table 21. This embodiment is similar in many respects to the previous embodiment shown in FIGS. 1 and 2. However, in the present embodiment, mounting section or frame 17 of the bed 16 is in contact with a top surface 19 of a housing 18 rather than its bottom surface. In addition, the bed 16 has a pair of guide wall sections 20 which extend generally vertically and terminate at a lower height as compared with the guide wall sections 2 of the previous embodiment. As a result, bottom ends 22 of the sliding table 21 are located at a lower position and in the illustrated extend partly into the space defined by a through hole 23 formed in the housing 18. In this embodiment, an exposed height H between the top surface 19 of the housing 18 and the top surface 24 of the sliding table 21 may be made as small as approximately 5 mm.

Figure 4:
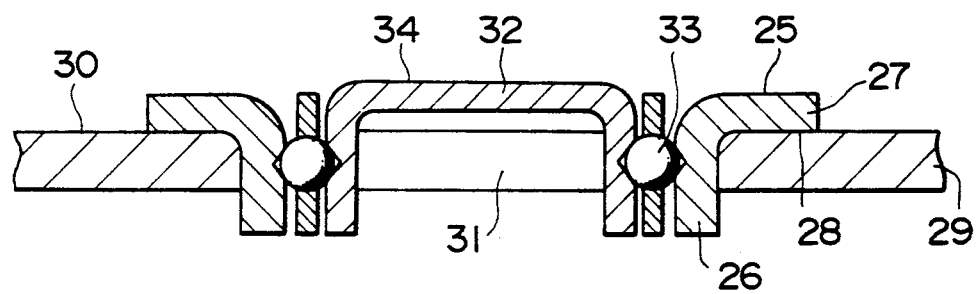

FIG. 4 illustrates a further embodiment of the present invention. This embodiment includes a bed 25 having a pair of guide wall sections 26, which extend generally vertically downwardly, a sliding table 32 and a plurality of rolling members 33 interposed between the bed 25 and the sliding table 32. The bed 25 also has a mounting section or frame 27 which extends generally horizontally and whose bottom surface 28 rests on a top surface 30 of a housing 29 having a through-hole 31. In this embodiment, a substantial portion of the linear motion guide unit is located inside the through-hole 31 of the housing 29. Thus, an exposed height H from the top surface 30 of the housing 29 to a top surface 34 of the sliding table 32 can be made extremely small and on the order of 1.5 mm–2 mm. In addition, as described with reference to the first embodiment shown in FIGS. 1 and 2, since each of guide channels defined by inner and outer guide grooves formed in the opposed surfaces of the vertical wall sections of the bed 25 and the sliding table 32 is located in horizontal alignment with the housing 29, the guide channel is well protected against possible deformations due to application of undersired forces. Thus, this embodiment also provides advantages of an enhanced structural integrity as well as reduced exposed height.

Figure 5:
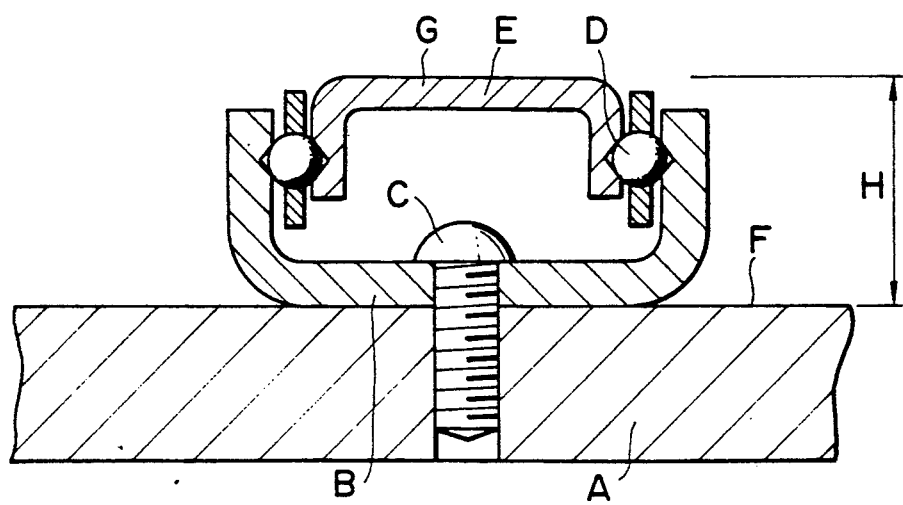
FIG. 5 is a schematic illustration showing in transverse cross section a typical prior art linear motion guide unit as mounted on an associated housing.

It is to be noted that although all of the above-described embodiments of the present invention has a bed generally in the shape of a picture frame and such a picture frame type bed is a preferred embodiment, the present invention should not be limited only to such a specific structure. That is, a bed may have various other shapes as long as it includes at least one mounting section which extends outward from a guide wall section in a direction away from the opposite guide wall section. Accordingly, the structure shown in FIG. 5 may be modified by cutting portions of the bottom wall section of the bed B and bending the portions thus cut to extend outward or in directions away from the opposite vertical wall sections. Such modifications should be covered by the scope of the present invention. Thus, in accordance with the present invention, it is only required to provide a mounting section which extends generally horizontally in an outward direction and which may be used to mount the linear motion guide unit on a desired object, such as a housing. It should also be noted that although a through-hole is formed in an associated housing in all of the above-described embodiments, such a through-hole may be replaced by a recess formed in the housing, if necessary.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion guide unit comprising:

a bed having a first guiding means, said bed being generally in the shape of a picture frame; pl a sliding table having a second guiding means located opposite to and in parallel with said first guiding means when assembled; and a plurality of rolling members interposed between said first and second guiding means, thereby providing a sliding contact between said bed and said sliding table;

whereby said bed includes:

a pair of guide wall sections formed with said first guiding means and spaced apart from each other over a predetermined distance, said guide wall sections extending generally vertically;

at least one connecting wall section connecting said pair of guide wall section; and at least one mounting wall section which extends generally horizontally from each of said pair of guide wall sections in a direction away from the opposite guide wall section, thereby allowing said mounting wall section to be placed on a desired object to be mounted, wherein said object to be mounted includes a recess or hole in which said unit is partly located.

2. The unit of claim 1, wherein said rolling members are located in said recess or hole.

3. The unit of claim 1, wherein said bed is generally in the shape of a rectangular plate formed with a rectangular hole generally at its center, and said pair of guide walls is formed on the opposite sides of said rectangular hole.

4. The unit of claim 3, wherein said plate is formed with a plurality of mounting holes so that the plate may be bolted to said object to be mounted.

* * * * *